US010569920B2

(12) United States Patent
Hinman et al.

(10) Patent No.: US 10,569,920 B2
(45) Date of Patent: Feb. 25, 2020

(54) LINERLESS ADHESIVE ACTIVATION

(71) Applicant: Jindal Films Americas LLC, LaGrange, GA (US)

(72) Inventors: Daniel L Hinman, Farmington, NY (US); Mark W Lockhart, Luxembourg (LU); Terry O Jensen, Cape Coral, FL (US); Robert M Sheppard, Peachtree City, GA (US); Thierry J. L. Dabadie, Luxembourg (LU); Alexandra N Wolfe, Newnan, GA (US); Anand Sundararaman, Strassen (LU); David J Hill, Webster, NY (US); David Piran, Saint-Laurent-sur-Othain (FR)

(73) Assignee: Jindal Films Americas LLC, LaGrange, GA (US)

( * ) Notice: Subject to any disclaimer, the term of this patent is extended or adjusted under 35 U.S.C. 154(b) by 0 days.

(21) Appl. No.: 16/125,852

(22) Filed: Sep. 10, 2018

(65) Prior Publication Data
US 2019/0002150 A1 Jan. 3, 2019

Related U.S. Application Data

(63) Continuation of application No. PCT/US2017/038164, filed on Jun. 19, 2017.

(60) Provisional application No. 62/351,637, filed on Jun. 17, 2016.

(51) Int. Cl.
*B65C 5/02* (2006.01)
*B32B 7/12* (2006.01)
*B32B 27/36* (2006.01)
*B32B 27/30* (2006.01)
*B32B 27/12* (2006.01)
*B32B 27/34* (2006.01)
*B32B 5/02* (2006.01)
*B32B 27/08* (2006.01)
*B32B 27/10* (2006.01)
*B32B 27/32* (2006.01)

(52) U.S. Cl.
CPC ............. *B65C 5/02* (2013.01); *B32B 5/02* (2013.01); *B32B 7/12* (2013.01); *B32B 27/08* (2013.01); *B32B 27/10* (2013.01); *B32B 27/12* (2013.01); *B32B 27/302* (2013.01); *B32B 27/304* (2013.01); *B32B 27/308* (2013.01); *B32B 27/32* (2013.01); *B32B 27/34* (2013.01); *B32B 27/36* (2013.01); *B32B 2250/02* (2013.01); *B32B 2250/03* (2013.01); *B32B 2250/24* (2013.01); *B32B 2255/10* (2013.01); *B32B 2255/205* (2013.01); *B32B 2255/26* (2013.01); *B32B 2255/28* (2013.01); *B32B 2270/00* (2013.01); *B32B 2307/306* (2013.01); *B32B 2307/40* (2013.01); *B32B 2307/4023* (2013.01); *B32B 2307/41* (2013.01); *B32B 2307/7265* (2013.01); *B32B 2307/746* (2013.01); *B32B 2307/75* (2013.01); *B32B 2307/756* (2013.01); *B32B 2405/00* (2013.01); *B32B 2519/00* (2013.01)

(58) Field of Classification Search
CPC ..... Y10T 428/31938; Y10T 428/24802; Y10T 428/24893; Y10T 428/2813; Y10T 428/2843; Y10T 428/2852
USPC ...................................................... 428/195.1
See application file for complete search history.

(56) References Cited

U.S. PATENT DOCUMENTS

| | | | |
|---|---|---|---|
| 3,558,881 A | 1/1971 | Gold | |
| 4,439,493 A * | 3/1984 | Hein | B32B 27/08 428/414 |
| 5,891,552 A | 4/1999 | Lu | |
| 6,127,032 A | 10/2000 | Kelch et al. | |
| 2009/0194450 A1* | 8/2009 | Dabadie | C09D 123/0815 206/484 |
| 2013/0133824 A1 | 5/2013 | Kian et al. | |
| 2014/0363593 A1 | 12/2014 | Liestman et al. | |
| 2019/0002150 A1* | 1/2019 | Hinman | B32B 7/12 |

FOREIGN PATENT DOCUMENTS

GB 2 154 012 B 3/1987

OTHER PUBLICATIONS

Shane Thomas, ISR and WO for PCT/US17/38164, Sep. 13, 2017 Alexandria, VA, US.

* cited by examiner

*Primary Examiner* — Betelhem Shewareged
(74) *Attorney, Agent, or Firm* — Rao DeBoer Osterrieder, PLLC; Erik J. Osterrieder

(57) ABSTRACT

This disclosure provides compositions, films, labels, structures and methods that may include a substrate having a first side and a second side, wherein the first side comprises a skin layer comprising at least 50 wt. % of high-density polyethylene. Further, the compositions may include a coating on the skin layer, wherein the coating comprises a topcoat and a primer, wherein the topcoat consists of: (i) at least 50 wt. % high-density polyethylene and one or more polyethylene polymers in water; (ii) wax, silicone or combination thereof; and (iii) optionally additives, whereupon imaging the composition by a thermal print head at a temperature of 300° C. or less results in no or negligible solvent-penetrability beneath the skin layer.

20 Claims, 14 Drawing Sheets

FIG. 1

| 1 DAY AFTER COATING | | | | | | |
|---|---|---|---|---|---|---|
| SAMPLE | | VEG. OIL | WINDEX | 409 | XYLENE | IPA | MOTOR OIL |
| UNCOATED | CONTROL | X | X | X | X | X | X |
| MICA PEI | EXAMPLE 1 | X | X | X | X | X | |
| PEI | EXAMPLE 2 | X | X | X | X | | |
| PU | EXAMPLE 3 | | | | | | |

FIG. 2

OPTICAL DENSITY

| FOR 3 IPS AND T = 25°C | | |
|---|---|---|
| SAMPLE | WHITE | BLACK |
| CONTROL | 0.23 | 1.68 |
|  | 0.24 | 1.64 |
|  |  | 1.55 |
| EXAMPLE 1 | 0.23 | 1.71 |
|  | 0.24 | 1.69 |
|  |  | 1.72 |
| EXAMPLE 2 | 0.24 | 1.75 |
|  | 0.25 | 1.69 |
|  |  | 1.65 |
| EXAMPLE 3 | 0.24 | 1.52 |
|  | 0.25 | 1.56 |
|  |  | 1.56 |

| FOR 6 IPS AND T = 25°C | | |
|---|---|---|
| SAMPLE | WHITE | BLACK |
| CONTROL | 0.22 | 1.15 |
|  | 0.22 | 1.03 |
|  |  | 1.07 |
| EXAMPLE 1 | 0.23 | 0.94 |
|  | 0.22 | 0.87 |
|  |  | 0.86 |
| EXAMPLE 2 | 0.23 | 0.94 |
|  | 0.23 | 0.95 |
|  |  | 0.93 |
| EXAMPLE 3 | 0.23 | 0.92 |
|  | 0.23 | 0.82 |
|  |  | 0.84 |

FIG. 3

TOPCOAT

| COMPONENTS | PHR |
|---|---|
| ME93935 | 100 |
| MICHEMGAURD 7140 | 5 |

ME93935 = NONIONIC POLYETHYLENE EMULSION: AVAILABLE FROM MICHELMAN
MICHEMGAURD 7140 = ANIONIC POLYETHYLENE DISPERSION: AVAILABLE FROM MICHELMAN

PRIMER

| | % SOLIDS | GRAMS |
|---|---|---|
| MICA H-760 A | 11.7% | 13 |
| DEIONIZED WATER | 0.3% | 487 |
| TOTAL BATCH | | 500 |

MICA H-760 A = WATER-BASED, MODIFIED POLYETHYLENIMINE RESIN DISPERSION: AVAILABLE FROM MICA CORPORATION

| EOSIN DYE OD | 0.045 TO 0.050 |
|---|---|
| COATING WEIGHT | 0.006 G/MSI |

EXAMPLE 1

FIG. 4

TOPCOAT

| COMPONENTS | PHR |
|---|---|
| ME93935 | 100 |
| MICHEMGAURD 7140 | 5 |

ME93935 = NONIONIC POLYETHYLENE EMULSION: AVAILABLE FROM MICHELMAN
MICHEMGAURD 7140 = ANIONIC POLYETHYLENE DISPERSION: AVAILABLE FROM MICHELMAN

PRIMER

|  | % SOLIDS | GRAMS |
|---|---|---|
| EPOMIN P-1050 | 11.7% | 13 |
| DEIONIZED WATER |  | 487 |
| TOTAL BATCH | 0.3% | 500 |

EPOMIN P-1050(PEI) = POLYETHYLENEIMINE: AVAILABLE FROM NIPPON SHORUBAI CO. LTD

| EOSIN DYE OD | 0.045 TO 0.050 |
|---|---|
| COATING WEIGHT | 0.006 G/MSI |

EXAMPLE 2

FIG. 5

TOPCOAT

| COMPONENTS | PHR |
|---|---|
| ME93935 | 100 |
| MICHEMGAURD 7140 | 5 |

ME93935 = NONIONIC POLYETHYLENE EMULSION: AVAILABLE FROM MICHELMAN
MICHEMGAURD 7140 = ANIONIC POLYETHYLENE DISPERSION: AVAILABLE FROM MICHELMAN

PRIMER

|  | % SOLIDS | GRAMS |
|---|---|---|
| PU-R610 | 28.0% | 16.1 |
| DEIONIZED WATER |  | 339 |
| TOTAL BATCH | 9.0% | 500 |

R610 = POLYURETHANE DISPERSION: AVAILABLE FROM DSM

| COATING WEIGHT | 0.1 G/MSI |
|---|---|

EXAMPLE 3

*FIG. 6*

| SAMPLE | WHITE | RUBBED REGION |
|---|---|---|
| CONTROL | 0.24 | 0.35 |
| | 0.25 | 0.31 |
| EXAMPLE 1 | 0.24 | 0.31 |
| | 0.26 | 0.31 |
| EXAMPLE 2 | 0.24 | 0.28 |
| | 0.25 | 0.32 |
| EXAMPLE 3 | 0.24 | 0.28 |
| | 0.22 | 0.29 |

RUBBED OPTICAL DENSITY

SW

CONTROL STRUCTURE OF THERMALLY PRINTABLE

| PRINT FACE SKIN | HDPE |
|---|---|
| VOIDED LAYER | HDPE + CAVITATING AGENT |
| PIGMENT LAYER | HDPE + CARBON BLACK MB |
| CORE LAYER | HDPE + CAVITATING AGENT |
| ADHESIVE FACE SKIN | MODIFIED ETHYLENE PROPYLENE COPOLYMER |

COATED VARIABLE

| | APPLIED WATER BASED COATING |
|---|---|
| | PRIMER |
| PRINT FACE SKIN | HDPE |
| VOIDED LAYER | HDPE + CAVITATING AGENT |
| PIGMENT LAYER | HDPE + CARBON BLACK MB |
| CORE LAYER | HDPE + CAVITATING AGENT |
| ADHESIVE FACE SKIN | MODIFIED ETHYLENE PROPYLENE COPOLYMER |

ME2

CONTROL STRUCTURE OF THERMALLY PRINTABLE

| PRINT FACE SKIN | EP COPOLYMER |
|---|---|
| VOIDED LAYER | POLYOLEFIN + CAVITATING AGENT |
| PIGMENT LAYER | POLYOLEFIN + FLUORESCENT ADDITIVE |
| CORE LAYER | HDPE + CAVITATING AGENT |
| ADHESIVE FACE SKIN | POLYOLEFIN |

COATED VARIABLE

| | APPLIED WATER BASED COATING |
|---|---|
| | PRIMER |
| PRINT FACE SKIN | EP COPOLYMER |
| VOIDED LAYER | HDPE + CAVITATING AGENT |
| PIGMENT LAYER | HDPE + CARBON BLACK MB |
| CORE LAYER | HDPE + CAVITATING AGENT |
| ADHESIVE FACE SKIN | MODIFIED ETHYLENE PROPYLENE COPOLYMER |

| SAMPLE | TOP COAT MATERIAL | IPA | VEGETABLE OIL |
|---|---|---|---|
| SW CONTROL | NO TOPCOAT | 3 | 3 |
| SW EXAMPLE 1 | MICA PRIMER, WAX TOPCOAT | 1 | 1 |
| SW EXAMPLE 3 | PU PRIMER, WAX TOPCOAT | 0 | 0 |
| ME2 CONTROL | NO TOPCOAT | 3 | 3 |
| SW EXAMPLE 3 | PU PRIMER, WAX TOPCOAT | 3 | 2 |
| SW EXAMPLE 1 | MICA PRIMER, WAX TOPCOAT | 2 | 2 |

| PRINTABLE SURFACE POLYMER |
| FILM CORE POLYMER |
| THERMALLY ACTIVATED ADHESIVE |

FIG. 9

| THERMALLY ACTIVATED ADHESIVE |
| PRINTABLE SURFACE POLYMER |
| FILM CORE POLYMER |
| TREATED OR UNTREATED POLYMER SURFACE |

FIG. 10

| PRINTABLE SURFACE POLYMER | EXAMPLE 1 | EXAMPLE 2 | EXAMPLE 3 | EXAMPLE 4 |
|---|---|---|---|---|
| BLACK COPOLYMER | 10 | 7.5 | 0 | 10 |
| PLASTICIZER 1 | 20 | 20 | 20 | 20 |
| PLASTICIZER 2 | 70 | 65 | 65 | 60 |
| ACID POLYMER | 0 | 5 | 0 | 10 |
| ACETATE POLYMER | 0 | 0 | 15 | 0 |
| WAX 1 | 0 | 2.5 | 0 | 2.5 |
| WAX 2 | 0 | 0 | 0 | 2.5 |

WEIGHT PERCENTAGE

FIG. 11

| TEST FILM PROPERTY | MEASUREMENT |
|---|---|
| POLY GAUGE (i.e., THICKNESS OF POLYMER WITHOUT THE AIR) | 1.96 MILS (± 5%) |
| YIELD | 14,026 IN$^2$/LB. (± 5%) |
| OPTICAL GAUGE (i.e., THICKNESS OF FILM) | 2.96 MILS (± 5%) |

STRUCTURE OF TEST FILM

FIG. 12

| LAYER | STRUCTURE | RESIN PERCENTAGE | POLY GAUGE |
|---|---|---|---|
| | CORONA TREATMENT | | |
| L1 | EP COPOLYMER<br>MDPE<br>ADDITIVES | 68<br>30<br>0 | 3.0 |
| L2 | HDPE<br>ZEOLITE-HDPE MB OR ANY OTHER VOIDING AGENT<br>(COLLAPSES L2 WITH HEAT; ZEOLITE IS AT LEAST<br>10 WT% OF L2)<br>ADDITIVES | 68<br>30<br><br><br>2 | 25.0 |
| L3 | HDPE<br>CARBON BLACK MB<br>ADDITIVES | 78<br>20<br>2 | 20.0 |
| L4 | HDPE<br>$CaCO_3$-HDPE MB OR ANY OTHER VOIDING AGENT<br>($CaCO_3$ IS AT LEAST 3 WT% OF L4)<br>ADDITIVES | 88<br>10<br><br>2 | 145 |
| L5 | EP COPOLYMER<br>OLEFIN BLOCK COPOLYMER<br>ADDITIVES | 50<br>48<br>2 | 3.0 |

STRUCTURE OF TEST FILM

*FIG. 13*

| COATING | STYRENE ACRYLIC BLOCK COPOLYMER (BINDER) | GLYCEROL TRIBUTYRATE (GTB) | PENTAERYTHRITOL TETRABENZOATE (PETB) | SECOND BINDER | | GTB/PETB | LOW Tg % | LOOPTRACK AGAINST GLASS AT 110°C |
|---|---|---|---|---|---|---|---|---|
| 1 | 5 | 30 | 55 | ACRYLIC/STYRENE COPOLYMER DISPERSION | 10 | 0.55 | 5 | 570 G/IN |
| 2 | 0 | 30 | 55 | ACRYLIC/STYRENE COPOLYMER DISPERSION | 15 | 0.55 | 0 | 570 G/IN |
| 3 | 10 | 30 | 50 | ACRYLIC/STYRENE COPOLYMER DISPERSION | 10 | 0.60 | 10 | 940 G/IN |
| 4 | 10 | 20 | 60 | ACRYLIC/STYRENE COPOLYMER DISPERSION | 10 | 0.33 | 10 | 583 G/IN |
| 5 | 10 | 20 | 60 | ETHYLENE ACRYLIC ACID POLYMER | 10 | 0.33 | 10 | 844 G/IN |

ACTIVATED TEST FILMS WITH COATINGS

FIG. 15

| LAYER | EXAMPLE A | EXAMPLE B | EXAMPLE C |
|---|---|---|---|
| SKIN LAYER | ACTIVATED ADHESIVE | ACTIVATED ADHESIVE | ACTIVATED ADHESIVE |
| VOIDED LAYER | PET FILM | PAPER | OPTIONALLY WHITE AND/OR ORIENTED POLYOLEFIN (e.g., PP, PE, COMBINATIONS THEREOF) FILM |
| PIGMENTED LAYER | | | |
| WHITE OPAQUE LAYER FOR IMAGE ENHANCEMENT | | | |
| ADHESIVE SURFACE | | | |
| ACTIVATED ADHESIVE | ACTIVATED ADHESIVE | ACTIVATED ADHESIVE | ACTIVATED ADHESIVE |

FIG. 16

| EXAMPLE A | EXAMPLE B | EXAMPLE C | EXAMPLE D | EXAMPLE E | EXAMPLE F |
|---|---|---|---|---|---|
| ACTIVATED ADHESIVE | SKIN LAYER | SKIN LAYER | SKIN LAYER | SKIN LAYER | PAPER |
| SKIN LAYER | VOIDED LAYER | WHITE/CLEAR POLYMER FILM | VOIDED LAYER | WHITE OPAQUE LAYER FOR IMAGE ENHANCEMENT | ACTIVATED ADHESIVE |
| VOIDED LAYER | PIGMENTED LAYER | METAL DEPOSITION LAYER(S) | PIGMENTED LAYER | VOIDED LAYER | |
| PIGMENTED LAYER | WHITE OPAQUE LAYER FOR IMAGE ENHANCEMENT | ACTIVATED ADHESIVE | WHITE OPAQUE LAYER FOR IMAGE ENHANCEMENT | SKIN LAYER | |
| WHITE OPAQUE LAYER FOR IMAGE ENHANCEMENT | ADHESIVE SURFACE | | VOIDED LAYER | ACTIVATED ADHESIVE | |
| ADHESIVE SURFACE | ACTIVATED ADHESIVE | | SKIN LAYER | | |
| | | | ACTIVATED ADHESIVE | | |

FIG. 17

| EXAMPLE A | EXAMPLE B | EXAMPLE C | EXAMPLE D | EXAMPLE E | EXAMPLE F |
|---|---|---|---|---|---|
| PRINT SURFACE (COATED OR UNCOATED) | | | | | |
| SOLID WHITE OPAQUE FILM | METALLIZED FILM | POLYETHYLENE FILM | HOLOGRAPHIC FILM | HOLOGRAPHIC PAPER | HOLOGRAPHIC FOIL |
| ADHESIVE SURFACE | | | | | |
| ACTIVATED ADHESIVE | | | | | |

LINERLESS ADHESIVE ACTIVATION

REFERENCE TO RELATED APPLICATION

This application is a continuation, which claims priority to Patent Cooperation Treaty application PCTUS1738164 filed on Jun. 19, 2017, which claims priority to U.S. provisional patent application Ser. No. 62/351,637 filed on Jun. 17, 2016, both of which are hereby incorporated by this reference in their entireties.

FIELD

This disclosure relates to compositions, structures, and methods for compositions having a structure comprising a substrate, such as single or multilayered films, containing printable coatings optionally having a printed image, such as text or artwork, and/or adhesives for use in manufacturing linerless labels, packaging, containers, tags, coupons, and/or other applications.

BACKGROUND

Linerless, pressure-sensitive, activated adhesives are generally blends of discrete componentry on the surface of a multilayered film that are non-tacky or inert in an un-activated state. Upon applying heat at a certain temperature, usually at or above about 65-70° C., the components will coalesce and create an adhesive surface. Linerless adhesives are currently activated with bulk-heating methods, such as infrared, hot air, or hot rolls. These methods create problems such as substrate distortion due to overheating, heat build-up in the applicator, ramp-up and ramp-down limitations, and operator safety concerns. These methods also add operational complexity to label delivery. This is a significant commercial hurdle for the linerless adhesive technology in workable compositions, structures, and methods of manufacture for ultimate use in various applications.

SUMMARY

In one aspect, disclosed is a composition, which is described as and also is a structure, that includes a substrate having a first side and a second side, wherein the first side has a skin layer comprising at least 50 wt. % of high-density polyethylene. Further, the composition may include a coating on the skin layer, wherein the coating may include a topcoat and a primer, wherein the primer may include polyethyleneimine or polyurethane, whereupon imaging the composition by a thermal print head at a temperature of 300° C. or less results in no, negligible, or minimal solvent-penetrability beneath the skin layer.

Additional aspects disclosed are that the composition may include one or more adhesive coatings are heat-activated. The composition may exhibit adhesion strengths of at least 570 g/inch on glass at 110° C. upon activation of the heat-activated adhesive coating(s). With the one or more adhesive coatings, the composition may be a linerless label, such that one or more adhesive coatings and one or more printed images on the composition are simultaneous activated. For purposes of this disclosure, simultaneous means at the same time or very close thereto such that, for example, it seems virtually simultaneous if not actually simultaneous. The composition may also include a pigmented layer, a metallized layer, a holographic layer or combination thereof on an activated, adhesive surface of the one or more adhesive coatings.

BRIEF DESCRIPTION OF THE SEVERAL VIEWS OF THE DRAWINGS

So that the manner in which the above recited features, advantages and objects of the present disclosure are attained and can be understood in detail, a more particular description of this disclosure, briefly summarized above, may be had by reference to the embodiments thereof which are illustrated in the appended drawings.

It is to be noted, however, that the appended drawings illustrate only typical embodiments of this disclosure and are therefore not to be considered limiting of its scope, for this disclosure may admit to other equally effective embodiments.

FIG. 1 depicts a table with solvent penetrability results a day after six different solvents that were applied to uncoated (i.e., control) and coated surfaces of multilayered films in accordance with this disclosure.

FIG. 2 depicts two tables showing optical densities of images printed at 3 inches per second and 6 inches per second on uncoated (i.e., control) and coated surfaces of multilayered films in accordance with this disclosure.

FIG. 3 depicts the details about the coating of Example 1, which includes a substrate with an HDPE skin, crosslinked PEI primer and a topcoat based on polyethylene chemistry in accordance with this disclosure.

FIG. 4 depicts the details about the coating of Example 2, which includes a substrate with an HDPE skin, PEI primer and a topcoat based on polyethylene chemistry in accordance with this disclosure.

FIG. 5 depicts the details about the coating of Example 3, which includes a substrate with an HDPE skin, PU primer and a topcoat based on polyethylene chemistry in accordance with this disclosure.

FIG. 6 depicts the mar-resistance on uncoated (i.e., control) and coated surfaces of multilayered films in accordance with this disclosure.

FIG. 7 depicts example structures of uncoated (i.e., control) and coated surfaces of multilayered films and their surfaces' solvent penetrability to isopropyl alcohol and vegetable oil in accordance with this disclosure.

FIG. 8 depicts an example embodiment of a thermal-activated label structure in accordance with this disclosure.

FIG. 9 depicts an example embodiment of a thermal-activated label structure in accordance with this disclosure.

FIG. 10 depicts example embodiments of the thermally activated, adhesive layers found in FIGS. 8 and 9 in accordance with this disclosure.

FIG. 11 depicts an example embodiment of a film capable of use with the methods, structures and compositions disclosed herein.

FIG. 12 depicts an example embodiment of the different layers or structure of a film capable of use with the methods, structures and compositions disclosed herein.

FIG. 13 depicts five different coatings applied to activated films in accordance with this disclosure.

FIG. 15 depicts example embodiments of linerless adhesive films capable of thermal print head activation without adhering to the surface of the print head and exiting the printer with an adhesive surface in accordance with this disclosure.

FIG. 16 depicts more example embodiments of linerless adhesive films capable of thermal print head activation without adhering to the surface of the print head and exiting the printer with an adhesive surface in accordance with this disclosure.

FIG. 17 depicts example embodiments of thermal activatable coatings in accordance with this disclosure.

DETAILED DESCRIPTION

Figure 14A:
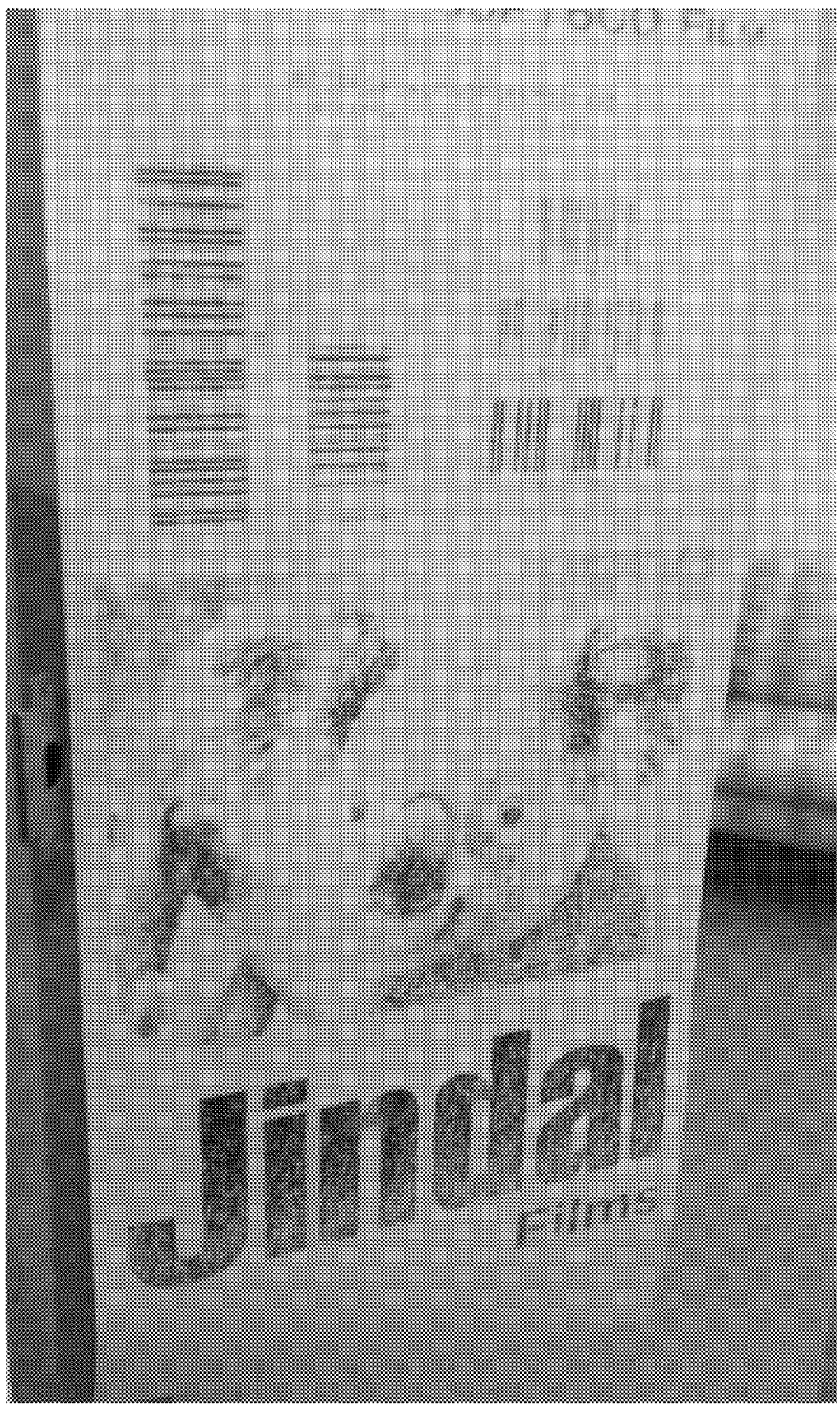
FIG. 14A is the obverse side of an image produced by a thermal printer on the thermally activated adhesive films of and in accordance with this disclosure, and more specifically, is an image that shows the simultaneously heat-activated adhesive and image printed by a thermal printer.

Below, directional terms, such as "above," "below," "upper," lower," "front," "back," "top," "bottom," etc. are used for convenience in referring to the accompanying drawings. In general, "above," "upper," "upward," "top," and similar terms refer to a direction away the earth's surface, and "below," "lower," "downward," "bottom," and similar terms refer to a direction toward the earth's surface, but is meant for illustrative purposes only, and the terms are not meant to limit the disclosure.

This disclosure relates to polyolefin and polystyrenic films, i.e., films, structures, articles, etc. that permit thermal printing and/or printing by application of pressure from pressure-applying devices, such as embossing through use of embossers, printing with an impact printer, etc. Generally, the term "films" may mean a composition containing a substrate, wherein the structure of the substrate has one or multiple layers. Herein, use of multilayer includes single-layered films. Furthermore, this disclosure relates to resin compositions for forming the foregoing, methods for forming multilayer films that permit thermal printing or printing by application of pressure from pressure-applying devices, methods that permit thermal printing or printing by application of pressure from pressure-applying devices, and apparatuses.

The polyolefin films may be enhanced through polymer modifications that include additives for UV stability and weatherability, such as Hindered Amine Light Stabilizers, or UV absorbers. Additional and alternative additives may include flame retardants, colorants. antistatic agents, slip agents, lubricants, blowing agents, and antiblocking additives. In some cases, the films, compositions, structures, and applications made therefrom, wherein one of these terms in this disclosure is inclusive of the other terms, may include a fluorescent additive in the pigment layer. After printing the element, the surface of the film may be unreadable or appear to be non-imaged, but if the film has a fluorescent additive, and such film is exposed to a particular UV lamp, then the fluorescent layer may emit the image.

Skin layers and/or coatings may be added to either side of the structures, and may create either matte and soft-touch or glossy and smooth surfaces. Compositionally, the coatings may include non-rigid or rigid, base polymers, wherein examples of the latter include acrylics and UV-cured coatings. Outer layers of the structures may include non-rigid or rigid polymers, such as one or more polyterpenes or cyclic olefin copolymers ("COCs"), which may hinder surface deformation that may be caused by pressure. Sharp points or high pressure may cause these structures to image in a way that is undesirable. To mitigate or avoid such undesirability, using a more rigid outer skin may hinder that action and create a more durable print surface that is valuable in various label applications, such as shipping containers and boxes.

The polyolefins used in layer of the films other than the HDPE-containing skin layer may include linear, low-density polyethylene ("LLDPE"), high-density polyethylene ("HDPE"), additional or other polyolefins and/or polyesters, and combinations of the foregoing. Coatings, which include a topcoat and optionally a primer, may include antimicrobial additives, such as silver salts that may render the surface sterile, and make the structures functional, for example, in medical applications. Harder or low coefficient of friction ("COF") surfaces may be employed on the structure's print face that creates a kind of scratch-resistant or mar-resistant surface, which, again, aids in improved surface durability in applications such as box labeling. Regardless of the selected coating(s), the coating composition should not hinder printability of the film's composition. In addition to the disclosed coatings, such as those in Examples 1-3 at FIGS. 3-5, providing mar-resistance as well as heat-resistance, as discussed beginning in the next paragraph, the low COF of these coatings' surfaces provide slip characteristics that allow the coated substrate, e.g., film, to pass through thermal print heads smoothly. This smooth passage results in minimal damage to the film surface and hence better solvent resistance. As a result, these low COF coatings, such as in Examples 1-3 at FIGS. 3-5, provide slippable coatings.

A drawback encountered in formulation is that a very hot print head (e.g., 300° C.) may create a microscopic adhesion, if not worse, at the very surface of the printed area. When the film passes through the print head, a microscopic tear occurs. This creates a type of passageway into the bulk structure of the film that may provide a path for solvents to penetrate the structure. When the solvent enters the structure, the voids existing in the structure are filled, and, therefore, do not refract light in the same way as when air did in these voids. As a result, light is not bent, but, instead, travels to a black pigment layer in the film and is absorbed. This absorption creates a black surface or other colored surface, depending on the pigment layer in the structure. A careful selection of coatings and/or underlying skin layers may mitigate the microscopic adhesion adhering to the print head.

Surprisingly, an interaction may occur between the skin layer and the coating. It has been found that placement of wax, silicone, or wax and silicone coatings on the surface of the thermally printable substrate hinders the adhering and tearing, but only when the skin contains HDPE as the primary component; wax and/or silicone do not work when the skin is solely an EP copolymer, is a blend of EP copolymer with one or more additional polymers, including, for instance, EP copolymer with MDPE. However, blends of HDPE with one or more EP copolymers and/or other copolymers work when HDPE is greater than 50 wt. %, and, for example, 60 wt. % HDPE with 40 wt. % EP copolymer(s), 70 wt. % HDPE with 30 wt. % EP copolymer(s), 80 wt. % HDPE with 20 wt. % EP copolymer(s) or 90 wt. % HDPE with 10 wt. % EP copolymer(s). So, the coating alone and the skin alone are inadequate, but when the coating is applied over an HDPE-containing skin, then there is a remarkable improvement in the resistance of the film's surface solvent penetrability, i.e., no or negligible solvent-penetrability. When the foregoing types of skin and coatings are applied together on the print face of the substrate, the print head no longer creates the above-described tearing, and, therefore, the consequential solvent pathway is not created into the bulk of the film. Without the pathway, a solvent cannot penetrate the surface, and the film does not turn black or another pigmented color. That is, the image remains undisturbed as desired.

This skin and coating partnership result is valuable in that solvent-resistant material creates a label substrate that can be applied in a very wide range of applications including, for instance, medical, automotive, industrial, agriculture, etc. Examples of structures that were effective are illustrated in the following figures and tables.

In FIG. 1, various solvents are used on samples to test the solvent penetration. When the sample visually darkened, this indicated that the solvent had penetrated the film structure and filled the voids, and, thereby, eliminated the light refracting that is otherwise a characteristic result of incident light on the voids; instead, the light was absorbed into the black or other pigmented layer and rendered the printed surface black or other pigmented color.

It is noted that the applied coatings had minimal impact on the color of the surface, i.e., reflectance, and the function of the printed image. This impact is evidenced by FIG. 2, which presents the optical densities measured by an X-Rite® densitometer at a temperature of 25° C. Note that the measured optical density of the "white," i.e., unprinted, surface is essentially the same measurement among the various coatings, namely Examples 1-3, as well as the control, which is an uncoated surface. A similar trend exists in the printed surfaces at least under the 3 inches per second ("IPS") case. Here the optical density measurements of the "black" image remains essentially constant. The 6 IPS data, however, begins to expose a slight impact on the heat transfer to the "black" image layer as the optical density is lower between the uncoated sample, i.e., control, and the coated samples, i.e., Examples 1-3.

Experiments revealed that the coatings may change the character of the product in that the mar resistance, i.e., rub durability, is essentially the same or better as the control, i.e., uncoated sample. This similarity is shown in FIG. 6 in which the sample was subjected to a Crockmeter rub test, which uses an industry standard crockmeter, such as a Taber® Crockmeter—Model 418, with only the arm weight, i.e., 900 g and no additional weight. The solid cylinder head covered with the standard cotton cloth is rubbed on the surface of the film for 50 rubs. In this case, the rubbed regional optical density increased (i.e., slightly darkened) in the rubbed area for the control. But, the coated samples, i.e., Examples 1-3, were not worse than the control; in some cases, the coated samples were better, a result meaning a lower optical density, i.e., darker, but not as dark as the control. Under test 1 the material elements were as shown below. That is, the material elements are the Examples 1-3 coating formulations applied to the SW base film and also to ME2 base film, wherein the coating formulations are displayed in FIGS. 3-5.

In this first test experiment resistance of the film, the coatings had a dramatic effect on the solvent-resistance of the film. In a second test experiment, the structure was changed by using an EP copolymer under the coating (ME2, i.e., film denoted as "manufacturing experiment" #2) instead of HDPE (SW, i.e., film made in the "semi-works").

In addition to the structures shown in FIG. 7, its numbers reflect the degree to which the solvent, i.e., isopropyl alcohol ("IPA") or vegetable oil, penetrated the thermally printed substrate: 0-3 reflects no penetration at 0 and very heavy penetration at 3. Note that in both controls the penetration is heavy and unacceptable. However, 0 and 1 scores are acceptable. Note that the coatings performed differently based on the substrate surface, an unexpected result. With ME2 material as the substrate, the coating was not as effective. This is attributed to the HDPE skin surface being relatively superior due to better synergy between the skin surface and the coatings applied in comparison to the EP copolymer surface.

The polyolefin film could also be coated with a heat-activated, adhesive coating, such as a combination of adhesive polymer, solid plasticizers, and tackifiers. In various combinations, these materials may have the desired non-tacky and non-blocking characteristics until the point at which the coating is brought to an adequate temperature to activate, i.e., fluidize, the componentry. As the components become fluidized, they blend, and this blend of materials has adhesive characteristics and behaves as a pressure-sensitive adhesive. These types of formulae are described in the literature, such as in U.S. Pat. No. 8,927,100 B2. It has been demonstrated that this polyolefin thermally printable structure may also be coated with a heat-activated adhesive coating and be activated with the same device that is used for printing.

This disclosure generally relates to apparatuses. methods and systems for a printing device associated with at least one thermal print head, which activates one or more heat-activated adhesives found, for example, in films, that may be used in various applications, including linerless, pressure-sensitive, label ("PSL") applications. For definitive purposes, "linerless" means an absence of the liner and backing papers found on lined labels. Unexpectedly, the one or more heat-activated adhesives, such as those in various polyolefinic and polystyrenic multilayer films, exited the print head without catastrophic complications, such as sticking or jamming, during printing operations. The thermal print head(s) provide a substantially uniform and consistent heat delivery to the surface of the label material, e.g., multilayer film, in contrast to bulk heating, which, may distort the label material's substrate, limit ramp-up and ramp-down capabilities, and so forth. This disclosure also unveils technology relating to thermal print head(s) that both activate one or more heat-activated adhesives and image simultaneously, thereby creating an image on the adhesive for applications, including, for example, those keyed to preserving evidentiary reliability, such as tamper-resistivity.

Activated linerless, pressure-sensitive adhesives are generally blends of discrete components, which, in a non-activated state, may be non-tacky or inert. Upon applying heat at a certain temperature, usually above about 65-70° C., the components will coalesce and create an adhesive surface.

Currently, linerless adhesives are activated with bulk heating methods, such as infrared ("IR"), hot air, or hot rolls. These heating methods create problems, such as substrate distortion due to overheating, heat build-up in the applicator, ramp-up and ramp-down limitations, and operator safety concerns. Another problem is that the heating methods add operational complexity to label delivery. The foregoing problems exemplify a few of the significant commercial hurdles in advancements in linerless adhesive technology.

Unexpectedly, it was found that use of a conventional, thermal print head, such as the type found in a Zebra® 140Xi4 printer, may effectively activate a thermal-activated adhesive in a linerless label material (i.e., "linerless adhesive"). https://www.zebra.com/lts/en/products/printers/industrial/xi-series.html (visited Jun. 17, 2016), the contents of which are incorporated herein. Unlike bulk-heating methods, heating with a thermal print head activates only the adhesive surface chemistry of the linerless adhesive. Such thermal print head is well-controlled, may be pattern-activated on demand, and possesses a small footprint. Further, it was found that when the adhesive was thermally activated, the material did not adhere to the high-temperature surface of the print head to the extent of failure or inability to dispense the printed label material. Instead, the label material exited the printer with an adhesive surface. Such thermal print head activation of linerless adhesives is a superior to typical bulk heating approaches. Moreover, in one example embodiment, the adhesive may be activated opposite the image layer. In another example embodiment, the adhesive may be placed over a direct thermal print surface and both the image and adhesive may be activated simultaneously.

FIGS. 8 and 9 depict different label materials, each having one or more thermal-activated, adhesive materials in an activated, adhesive layer that is located adjacent to other components to form a coextruded and/or coated multilayer film having one or more optionally oriented (i.e., machine direction, transverse direction, or both) and/or treated layers that may include additives for cavitation, dispersion, anti-blocking, slipping, anti-oxidizing, plasticizing, adhesion promoters (e.g., ethylene vinyl acetate ("EVA")), whiteners, color enhancers, and/or barriers to moisture and/or gas, as well as other additive types and combinations thereof. Contemplated multilayer films may include a core adjacent to one or more tie layers and/or skin layers, and such films may include any polymer, which is understood to be a polyolefin, such as polypropylene ("PP"), polyethylene ("PE"), polybutene ("PB"), polyvinyl chloride ("PVC"), copolymers, terpolymers and blends thereof as well as from very low to very high densities (e.g., VLD=very low density; LD=low density; MD=medium density; HD=high density), and regardless whether metallocene or non-metallocene catalyzed. Other contemplated polymers include polystyrene ("PS"), styrene-acrylic copolymers, polyethylene terephthalate ("PET") and nylon. The polymer may be thermoplastic, elastomeric, linear, branched, grafted, block and/or have the same or different stereoregularity as compared to other components of the film. Although polymer and layer are often used in the singular herein, the words "polymer" and "layer" may include one or more polymers and layers, respectively. For instance, in FIG. 8, three layers are depicted, but each layer may comprise one or more layers that actually constitute that layer.

In line with the foregoing discussion, the thermally activated adhesive may include styrene-acrylic block copolymer, plasticizers, wax, and adhesion promoter(s), such as EVA. FIG. 10 illustrates example embodiments of compositions, in weight-percentage, for the thermally activated adhesive layer found, for example, at FIGS. 8 and 9.

The example compositions in FIG. 3 were tested on a Zebra® 140Xi4 printer with settings of 2 inches per second at ambient temperature and pressure, and, specifically, at 25° C. and 28° C.

In another test, an un-activated adhesive coating was applied to the print face of a test film. The test nm surprisingly revealed a two-fold effect, i.e., activating the adhesive and creating an image. That is, the test run surprisingly revealed that the printed image could be created while simultaneously activating the linerless adhesive applied to the test film. FIG. 11 details the specifics about the structure of the test film described in FIG. 12, which details each layer in the test film.

Notably, FIG. 12 depicts example embodiments of films that may be used in accordance with the disclosures herein. Other variations exist, and, for example, include: (1) L1 and/or LS being EP copolymer(s), LLDPE, LDPE, MDPE, HDPE, combinations thereof, or PP or propylene copolymers; (2) L2 and L4 containing the same or different types of voiding agents as well as one or more voiding agents in the same or different polymer matrix, e.g., LLDPE, LDPE, MDPE, HDPE, combinations thereof, to yield the particular masterbatch ("MB") mixture; and (3) pigments in place of or in addition to carbon black. In these different, example embodiments, percentages of resin may be different than those described in FIG. 12, but the voiding agent minima remain.

FIG. 13 depicts example activatable coatings for application to the test film in FIG. 12 or in the alternative, example embodiments discussed in the preceding paragraph. The activated test films with coatings were placed on window glass and demonstrated adequate adhesion as shown in the rightmost column in FIG. 13.

Figure 14B:
FIG. 14B is the reverse side, i.e., adhesive side, of the image shown in FIG. 14A that is adhered to an office door and in accordance with this disclosure.
Figure 14C:
FIG. 14C is the reverse side, i.e., adhesive side, of the image shown in FIG. 14A that is adhered to an office door and in accordance with this disclosure

By way of further illustration, FIGS. 14A-14C show re-produced results from printing by a Zebra® 140Xi4 printer used in conjunction with thermally activated adhesives on films as described by this disclosure and the particular description found at the respective figure. For example, FIG. 14A shows the simultaneously heat-activated adhesive and image printed by a thermal printer, whereby the image is adhered to an office door. FIGS. 14B and 14C show the reverse side, i.e., adhesive side, of FIG. 14A after heat-activation by a thermal printer followed by adhering to the office door. For FIGS. 14A-14C, coating 5 from FIG. 13 was applied to the test film from FIG. 12.

Further example embodiments of linerless adhesives are illustrated at FIG. 15. The linerless adhesives provided by this disclosure may have various applications, which include tags and labels of various sizes and shapes for various markets or industries, e.g., lift tickets, pricing, posters, park passes, etc. Generally, the middle portions e.g., PET film, paper, or cavitated (i.e., containing void-initiating agent) white film, of Examples A, B, and C may be viewed as the substrate of the composition, which is made up of four layers; alternatively and/or optionally, these four layers may be reduced to a combination effect, e.g., combination of the pigmented layer and the white-opaque layer, etc. Cloth is another example of a suitable substrate. Regardless, in these examples, the substrate is flanked by at least one activated adhesive and then coated.

Turning now to more specific embodiments of linerless adhesives, FIG. 16 shows example structures. Example A may be directly, thermally imaged and the adhesive activated. Example applications of many are for Example 1 to constitute at least the general componentry for a prize label or a money-off coupon because Example A is a substantially opaque film. As a result, the prize or coupon participant does not see the prize or the money-off amount until after removing the label.

In Examples B and C of FIG. 16, these structures, for example, may enable pre-printed labels. The adhesive surface may be activated so as to show words, such as "void," or any phrase or indicia for that matter, so that when the label was removed, the words, phrase or indicia would transfer the glue image (i.e., the activated-adhesive image) or glue metal image (i.e., the activated-adhesive pulling off the metal to form the image) to the labeled surface. With the instant disclosure and, in particular, with reference to the structure in FIG. 16, it is possible to pattern activate the adhesive so that when the label is removed, film or paper fibers may be transferred to activated adhesive areas now on the surface of the container, bag, package, or other object.

Turning now to still more example embodiments of linerless adhesives, FIG. 17 is presented that shows a generally four-layer structure, wherein a print surface is adjacent to a varying layer, which is adjacent to an adhesive surface followed by an activated adhesive. With regard to Example 15, depending on the surface metallized for the holographic effect, the adhesive may be activated and when the label is removed from the product, the holographic image would transfer to the labeled object.

While the foregoing is directed to example embodiments of the disclosed invention, other and further embodiments may be devised without departing from the basic scope thereof, wherein the scope of the disclosed apparatuses, systems and methods are determined by one or more claims.

What is claimed is:

1. A composition, comprising:
 a substrate having a first side and a second side, wherein the first side comprises a skin layer comprising at least 50 wt. % of high-density polyethylene; and
 a coating on the skin layer, wherein the coating comprises a topcoat and a primer, wherein the topcoat consists of: (i) at least 50 wt. % high-density polyethylene and one or more polyethylene polymers in water; (ii) wax, silicone or combination thereof; and (iii) optionally additives,
 whereupon imaging the composition by a thermal print head at a temperature of 300° C. or less results in no or negligible solvent-penetrability beneath the skin layer.

2. The composition of claim 1, wherein the substrate comprises a multilayered film, a single-layered film, paper, or cloth.

3. The composition of claim 1, wherein the substrate comprises one or more polyolefins, polystyrenes, or both.

4. The composition of claim 1, further comprising one or more additives in one or more layers of the composition.

5. The composition of claim 1, wherein the primer comprises polyethyleneimine or polyurethane.

6. The composition of claim 1, wherein the at least 50 wt. % high-density polyethylene and one or more polyethylene polymers in water are a nonionic polyethylene emulsion and an anionic polyethylene dispersion in water.

7. The composition of claim 1, wherein the one or more polyethylene polymers comprise ethylene-propylene polymers, medium-density polyethylene, high-density polyethylene, or combinations thereof.

8. The composition of claim 1, wherein the primer is water-based.

9. The composition of claim 1, further comprising one or more tie layers.

10. The composition of claim 1, wherein the coating is mar-resistant, slippable, heat-resistant or combinations thereof.

11. The composition of claim 1, wherein the skin layer further comprises one or more copolymers.

12. The composition of claim 11, wherein the one or more copolymers comprise ethylene-propylene copolymers.

13. The composition of claim 1, further comprising one or more printed images on the coating.

14. The composition of claim 1, further comprising one or more adhesive coatings on the coating, the second side or both.

15. The composition of claim 14, wherein the one or more adhesive coatings are heat-activated.

16. The composition of claim 15, wherein adhesion strength of the one or more adhesive coatings, upon activation, is at least 570 g/inch on glass at 110° C.

17. The composition of claim 14, wherein the composition is a linerless label.

18. The composition of claim 14, further comprising simultaneous activation by the thermal print head of the one or more adhesive coatings and one or more printed images on the composition.

19. The composition of claim 14, further comprising a pigmented layer, a metallized layer, a holographic layer or combination thereof on an activated, adhesive surface of the one or more adhesive coatings.

20. The composition of claim 14, wherein the substrate comprises a pigmented layer, a white-opaque layer, a voided layer, or a combination thereof optionally combined into a reduced number of layers.

* * * * *